(12) United States Patent  
Salomon-Bahls et al.

(10) Patent No.: US 7,922,215 B2
(45) Date of Patent: Apr. 12, 2011

(54) PLUG CONNECTOR FOR FLUID CONDUITS

(75) Inventors: Bernd Salomon-Bahls, Halver (DE); Dirk Dresen, Leverkusen (DE); Ingo Hüpgen, Kürlen (DE)

(73) Assignee: Voss Automotive GmbH, Wipperfurth (DE)

( * ) Notice: Subject to any disclaimer, the term of this patent is extended or adjusted under 35 U.S.C. 154(b) by 486 days.

(21) Appl. No.: 10/596,728

(22) PCT Filed: Dec. 17, 2004

(86) PCT No.: PCT/EP2004/053588
§ 371 (c)(1),
(2), (4) Date: Jun. 6, 2007

(87) PCT Pub. No.: WO2005/064222
PCT Pub. Date: Jul. 14, 2005

(65) Prior Publication Data
US 2007/0284875 A1 Dec. 13, 2007

(30) Foreign Application Priority Data
Dec. 23, 2003 (DE) .............................. 203 19 959 U

(51) Int. Cl.
*F16L 19/06* (2006.01)
(52) U.S. Cl. .................... 285/339; 285/924; 285/331

(58) Field of Classification Search .................. 285/255, 285/307, 339, 342, 343, 375, 924, 331, 1, 285/900
See application file for complete search history.

(56) References Cited

U.S. PATENT DOCUMENTS

| | | | | | |
|---|---|---|---|---|---|
| 3,649,050 | A | * | 3/1972 | Woodling | 285/12 |
| 4,431,216 | A | * | 2/1984 | Legris | 285/104 |
| 5,403,046 | A | * | 4/1995 | Kooten | 285/319 |
| 6,447,019 | B1 | * | 9/2002 | Hosono et al. | 285/148.19 |
| 6,764,102 | B2 | * | 7/2004 | Ezura | 285/45 |
| 2003/0178846 | A1 | * | 9/2003 | Ezura | 285/322 |

FOREIGN PATENT DOCUMENTS

EP   0 733 844 A   9/1996

* cited by examiner

*Primary Examiner* — James M Hewitt
*Assistant Examiner* — Gwendolyn D Fournet
(74) *Attorney, Agent, or Firm* — Brinks Hofer Gilson & Lione

(57) ABSTRACT

A plug connector for fluid conduits. The plug connector including a housing part with a plug socket for the fluid-tight insertion of a tubular plug-in part, a holding element for locking and a fluid seal for sealing the inserted plug-in part. The plug connector being arranged in a plug socket, the housing part being in two parts comprising a base part and an insert plate which is connected to the base part via a snap-action positive fit connection. The base part comprising a receiving part for the holding element, the fluid seal and the insert part, and a joining part for the joining connection of the housing part to a fluid conduit.

13 Claims, 4 Drawing Sheets

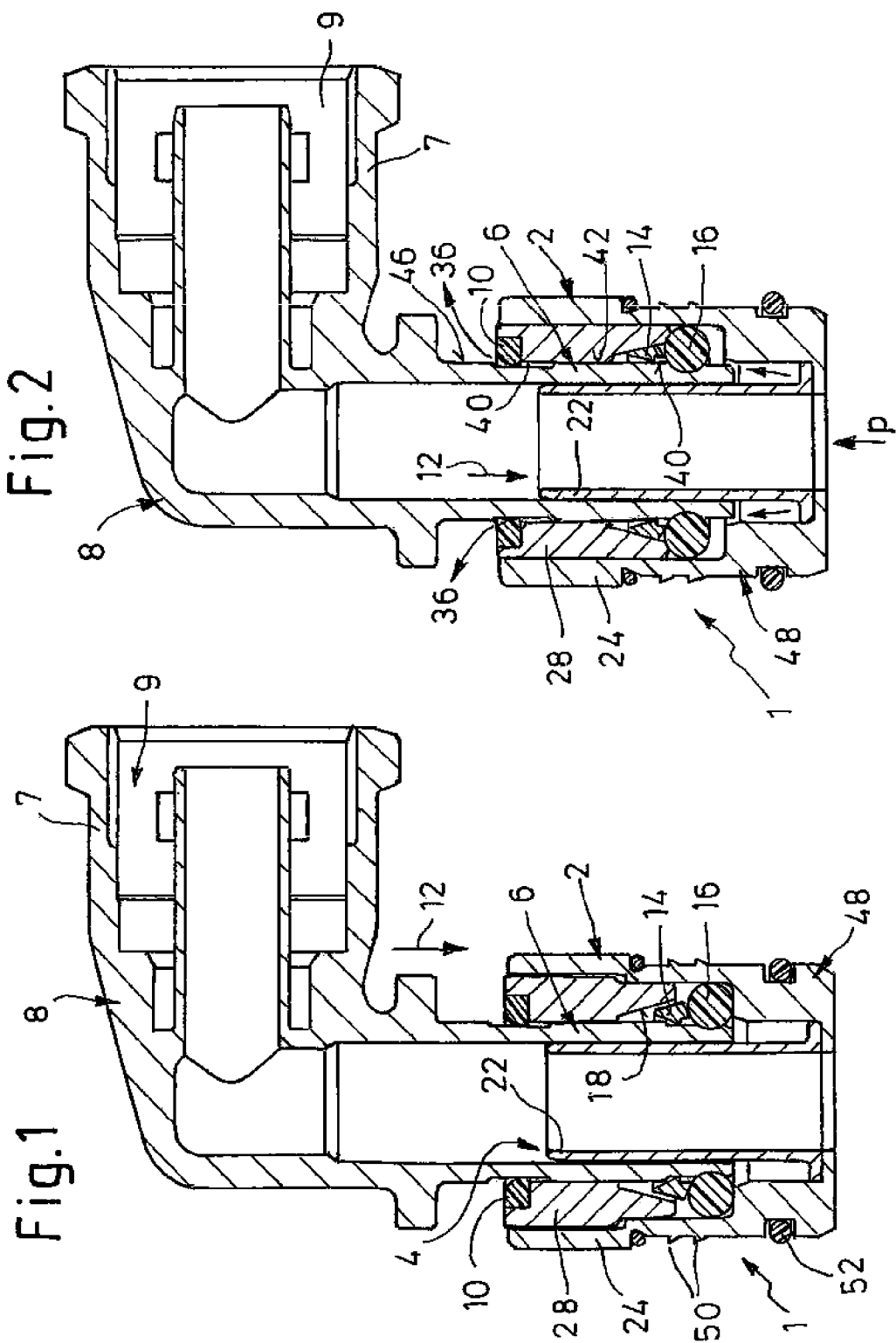

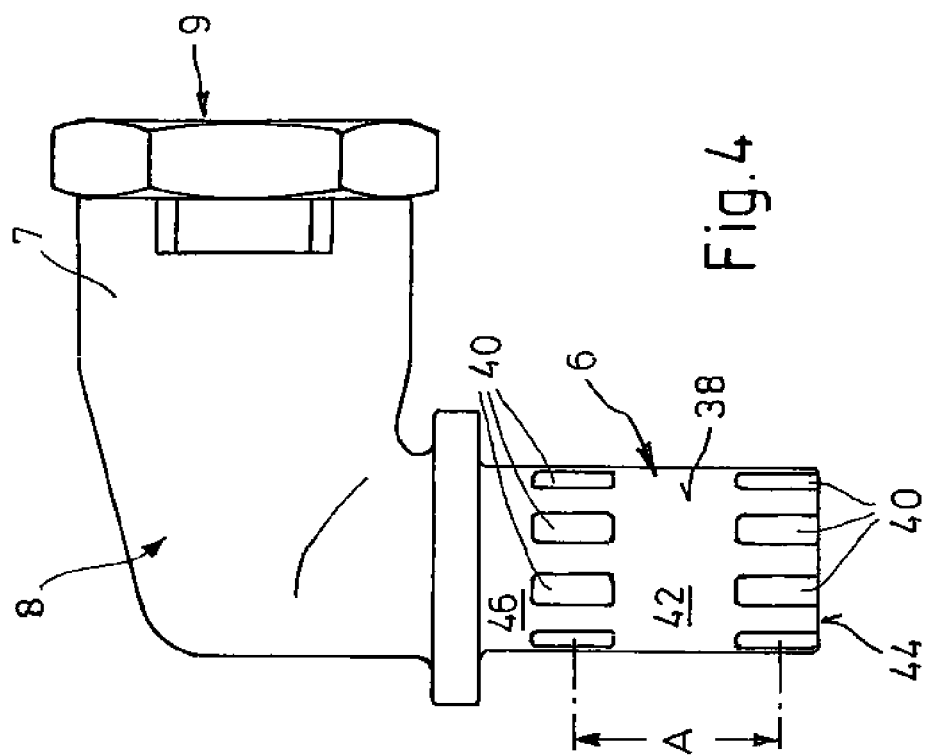
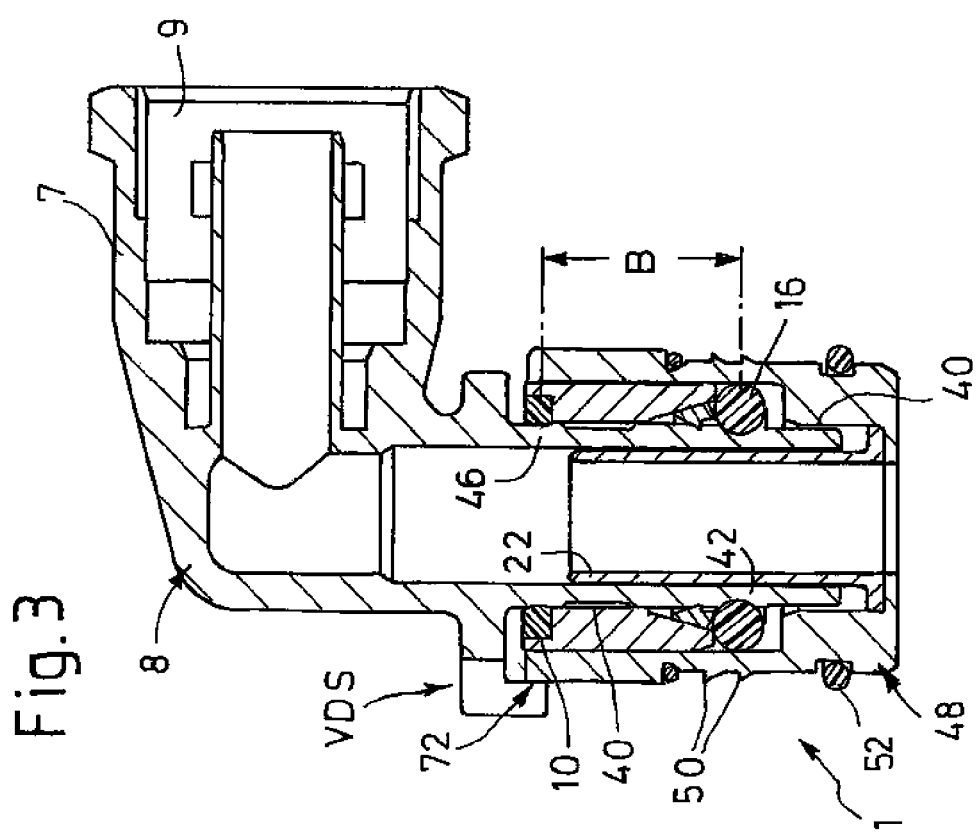

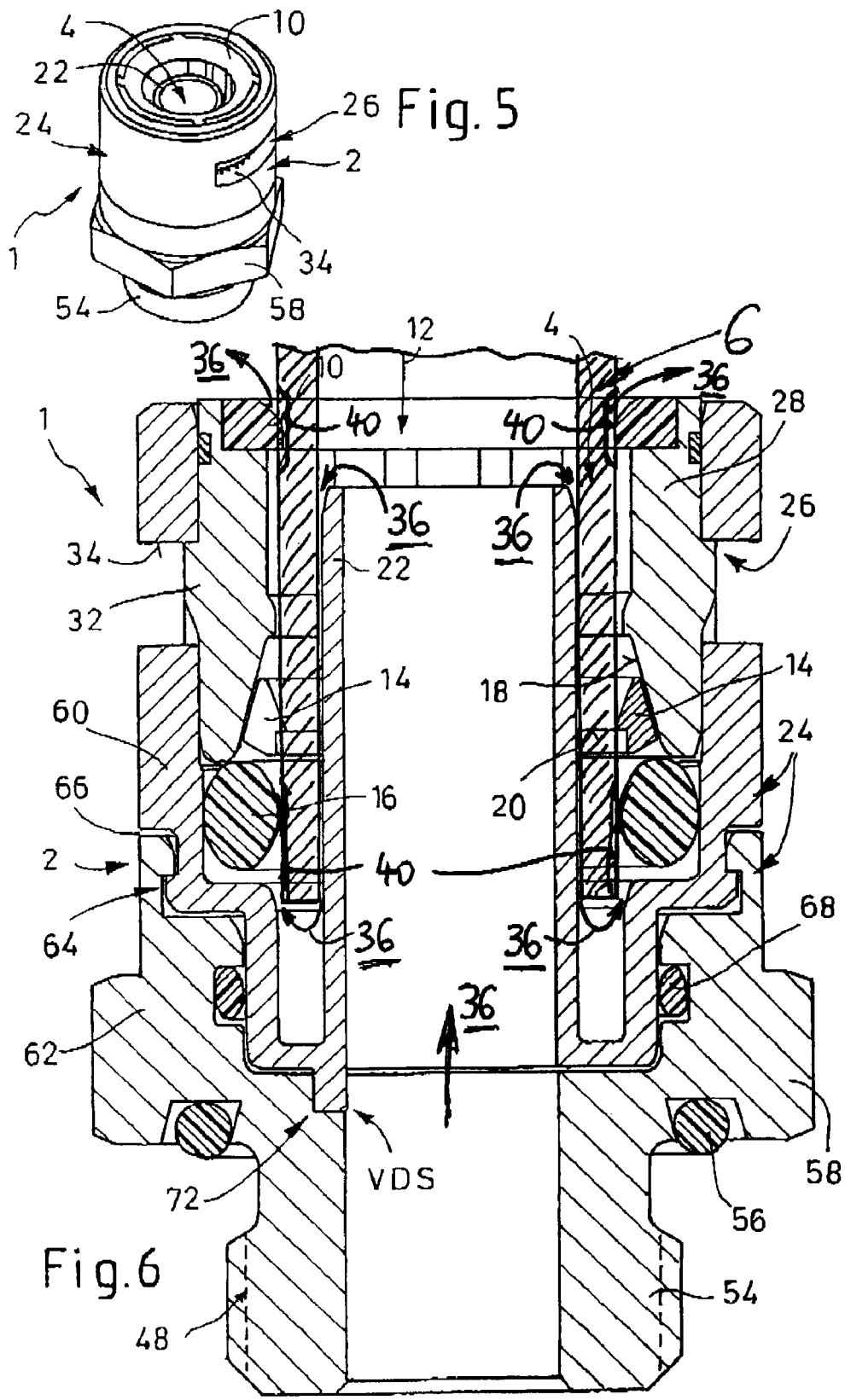

PLUG CONNECTOR FOR FLUID CONDUITS

CROSS REFERENCE TO RELATED APPLICATIONS

This application claims priority to DE 203 19 959.6, filed Dec. 23, 2003 and PCT/EP2004/053588, filed Dec. 17, 2004.

FIELD OF THE INVENTION

The present invention relates to a plug connector for fluid conduits.

BACKGROUND OF THE INVENTION

EP 0 733 844 B1 describes a joining device for fluid conduits. In the device described in the aforementioned application, the division of the housing part into two permits simple installation and removal and release of the plug-in part. The insert part comprises a single-piece plastic molded part, with a dirt seal, which is intended to prevent penetration of dust, dirt, moisture (spray water) and the like, being integrally formed as a single piece in the form of encircling sealing lip. For the purpose of being able to release the plug-in part, the insert part has two elastic latching arms which engage in the base part and in latching openings formed there by means of latching extensions. Each latching arm has an actuating section which protrudes outward out of the base part.

The object of the present invention is to further improve and to simplify a plug connector of the general type described in the above mentioned patent application.

SUMMARY OF THE INVENTION

According to the present invention, the base part of the fluid conduit designed in two parts including a receiving part for the holding element, the fluid seal and the insert part, and a joining part for the joining connection of the housing part to a fluid conduit. As a result, various embodiments of the joining part in the manner of an adaptor can be provided, the joining part preferably being connectable to the receiving part, which is of consistently identical design. The connecting region between receiving part and joining part is therefore also of consistently identical design. It is preferably a snap-action positive fit connection with a profile which is closed in the circumferential direction. In addition, there is also the possibility as a result of being able to produce the two parts of the base part from different materials. The receiving part preferably consists of plastic while the joining part consists of a metal such as brass.

In a preferred embodiment of the invention, it is provided that first of all the holding element for locking the inserted plug-in part and then the fluid seal are arranged within the plug socket, as seen in the plug-in direction starting from a dirt seal on the mouth side, with a leakage path being formed in such a manner that, in a pre-locking position of the plug-in part, which position is locked by the holding element but is not yet sealed via the fluid seal, a physically perceptible leakage is provided. As a result, a position which is not entirely plugged in, and although already locked is not yet correctly sealed is therefore to be noticeable by a leakage being perceptible, in particular acoustically by the formation of a noise, via the leakage path. It is advantageous if the leakage path is formed by depressions which are arranged on the outer circumference of the plug-in part and, in the pre-locking position, are arranged firstly in the region of the fluid seal and secondly in the region of the dirt seal. This refinement obviates a need to provide an opening in the housing part of the leakage path, and simple and cost-effective O-rings can be used as the seals (in particular for the fluid seal). The leakage then takes place in the pre-locking position radially inward via the respective depression of the plug-in part and axially past the sealing ring spanning the depression. In the completely plugged-in full plug-in position, the seals then entirely bear in the circumferential direction on cylindrical sealing sections of the plug-in part. This produces a structurally very simple and cost-effective embodiment. In this case, the plug-in part is preferably designed as a molded part of plastic. This permits simple molding of the depression.

Further refinement features are contained in the description below.

BRIEF DESCRIPTION OF THE DRAWINGS

The invention will be explained more precisely with reference to the preferred exemplary embodiments which are illustrated in the drawing, in which:

FIG. 1 shows a longitudinal section through a plug connector according to this invention with plug-in part during the plug-in operation, i.e. in a position in which it is not yet entirely plugged-in, FIG. 2 shows an illustration analogous to FIG. 1 with the plug-in part, which is in a pre-locking position being pressurized in order to explain the leakage path, FIG. 3 shows a further illustration analogous to FIGS. 1 and 2 with rotational securing of the plug-part in the entirely plugged-in and sealed full plug-in position, FIG. 4 shows a side view just of the plug-in part of the embodiment according to FIGS. 1 to 3, FIG. 5 shows a perspective view of a second embodiment of a plug connector according to the invention (without plug-in part), FIG. 6 shows an enlarged longitudinal sectional illustration of the plug connector according to FIG. 5.

DETAILED DESCRIPTION OF THE INVENTION

Figure 7:
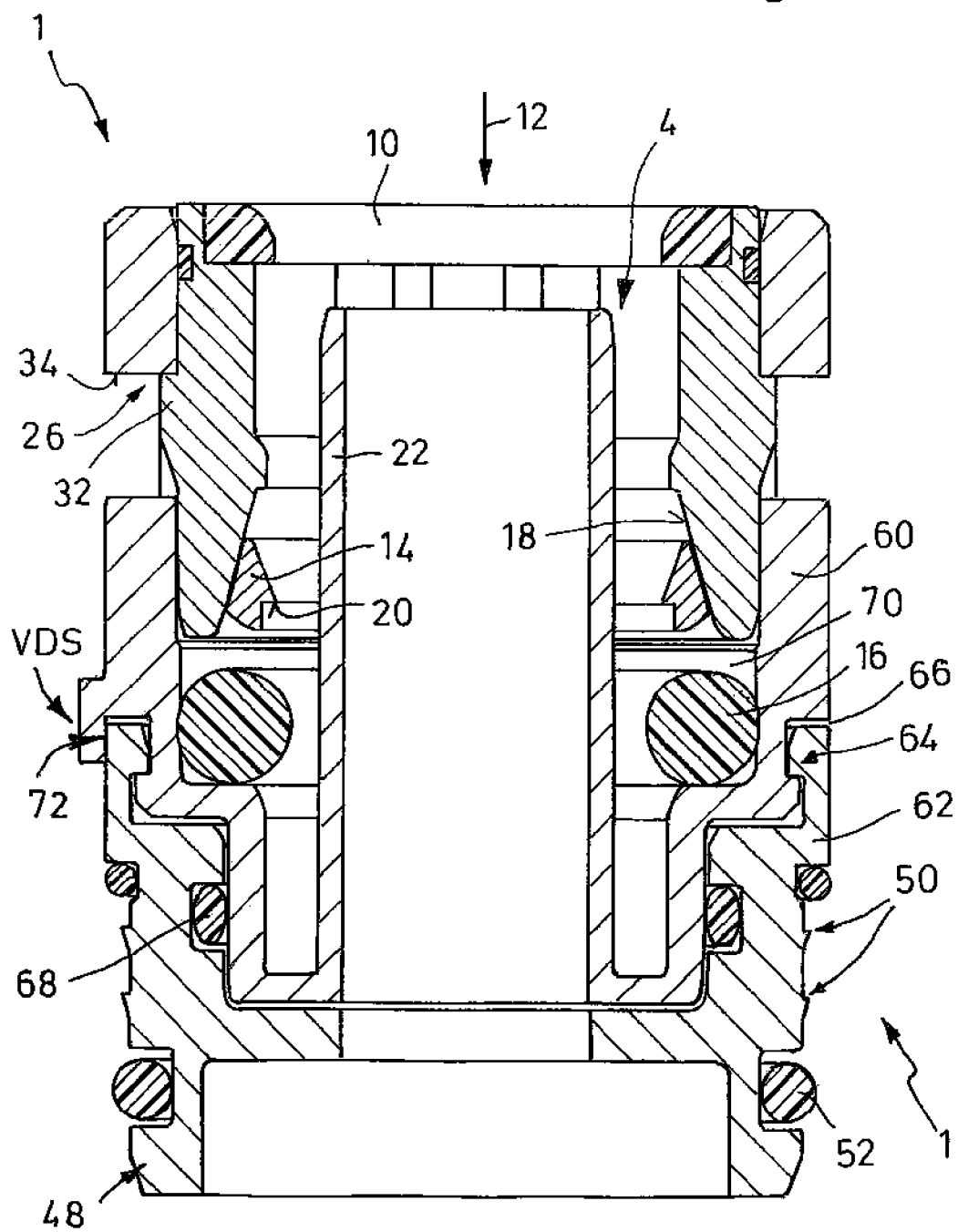
FIG. 7 shows an illustration analogous to FIG. 6 in a variant embodiment.

In the various figures of the drawing, identical parts are always provided with the same reference numbers. Therefore, every description of a part with reference to a certain figure of the drawing also applies analogously to all other figures of the drawing in which said part with the corresponding reference number can likewise be seen.

In all of the exemplary embodiments, a plug connector 1 comprises a housing part 2 with (at least) one plug socket 4 (see in particular FIGS. 5 to 7) for the axial, fluid-tight insertion of a tubular plug-in part 6 (see in this regard the separate illustration in FIG. 4). In this example, the plug-in part 6 is designed as a section of a connector piece 8 which—as illustrated—may be designed, for example, as an angle connector. On its side opposite the plug-in part 6, the connector piece 8 can have a connecting section 7 which can be formed analogously to the plug connector 1 or the housing part 2 as a plug socket 9 of similar kind. The connector piece 8 is preferably formed from a single-piece molded part of plastic. However, in principle, the plug connector 1 is also suitable for the direct connection of pipelines, with the plug-in part 6 then being formed by one end of the pipeline (not illustrated).

Within the plug socket 4, first of all a holding element 14 for locking the inserted plug-in part 6 and, in an adjoining region, a fluid seal 16 (pressure seal) are arranged as seen in the plug-in direction (arrow 12) starting from a dirt seal 10 on the mouth side. The dirt seal 10 and the fluid seal 16 come directly to bear circumferentially on the outer circumference of the inserted plug-in part 6 (see FIG. 3). The holding element 14 is preferably designed as a slotted clamping ring which is thereby radially elastic and, to lock the plug-in part 6, interacts with an internal cone 18 in the plug socket 4 in such a manner that it is deformed (constricted) by a movement radially inward via the internal cone 18 counter to the plug-in direction 12 in order to secure the plug-in part 6 in a clamping manner. In this case, it acts with at least one radially inwardly protruding, encircling tooth edge 20 against the outer circumference of the plug-in part 6. In this respect, reference is made in particular to the enlarged illustration in FIG. 6. By means of this configuration, a movement of the previously inserted plug-in part 6 back in the release direction causes the holding element 14 or the clamping ring to first of all be carried along by frictional contact of its tooth edge 20 until it comes with its external cone to bear in the internal cone 18 of the housing part 2. Upon pulling further, the cones cause a radially inwardly directed force to be produced by means of which the clamping ring is constricted elastically, so that the tooth edge 20 interacts frictionally and/or with a positive fit with the essentially smooth-surfaced, cylindrical outer circumference of the plug-in part 6 and the latter is thus locked against being pulled out.

In a further preferred refinement, a supporting sleeve 22, which is coaxial with the plug axis, is arranged within the housing part 2 for frictional, play-free engagement in the inserted plug-in part 6. The supporting sleeve 22 therefore supports the plugged-on plug-in part 6 radially from the inside firstly counter to the radial force applied via the holding element 14 and secondly also counter to the bearing force of the fluid seal 16. As a result, the plug connector 1 is in principle also suitable for hose lines.

For the purpose of being able to produce and fit the plug connector 1, the housing part 2 is designed in two parts comprising a base part 24 and an insert part 28 which is connected to the latter via a snap-action positive fit connection 26 (positive-fitting latching connection with an active-surface undercut angle of greater than/equal to 90°; see in this respect in particular FIGS. 5 to 7) and has the internal cone 18. In this case, the insert part 28 has the dirt seal 10 for bearing circumferentially on the inserted plug-in part 6.

The insert part 28 is designed together with the dirt seal 10 as a single-piece two-component molded part of two different plastic materials, to be precise, the insert part 28 consists of a first, relatively hard and dimensionally stable plastic while the dirt seal 10 is integrally formed directly as a single piece in a material-locking manner from a second, relatively softer and elastic plastic. In this case, on its radially inwardly pointing side, the dirt seal 10, see in this respect in particular FIGS. 6 and 7, has a bead-like sealing region for resting circumferentially on the plug-in part 6.

The insert part 28 is designed together with the dirt seal 10 overall essentially in the shape of a sleeve and is inserted or can be inserted into a widening of the plug socket 4 of the base part 24, preferably with a press fit, and, as a result, in a manner such that it is sealed at least against the penetration of dirt and foreign materials of similar type. It is advantageous if, in the inserted state, the insert part 28 lies on its mouth side completely flush within the base part 24. This results in a compact constructional form of the plug connector 1 which, on the mouth side, has a planar end surface closed toward the plug-in part 6 via the dirt seal 10.

The snap-action positive fit connection 26 can be a closed design of latching elements (not illustrated) encircling in the circumferential direction, leading, owing to the positive fit achieved, to it not being possible for the plug-in part 6 to be released.

In contrast to this, however, in the embodiments illustrated, in order to be able to release the plug-in part 6 provision is made for the sleeve-shaped insert part 28 to have at least two radially elastic spring arms (not visible in the drawings) formed by longitudinal slots. Each spring arm engages releasably by means of a radially outwardly projecting lug-like latching attachment 32 into a corresponding latching opening 34 of the base part 24 with a positive fit, i.e. with an undercut of greater than/equal to 90° (see FIGS. 5 to 7). The latching openings 34 are designed as radial passage openings, with the result that, in order to release them, the latching attachments 32 can be reached from the outside with a suitable tool and can be moved radially inward, thus enabling the plug-in part 6 to be removed together with the holding element 14 and the insert part 28.

Owing to the described configuration and arrangement of the holding element 14 and of the fluid seal 16, the plug connector 1 according to the invention operates in accordance with the plug-in principle "holding before sealing" because the plug-in part 6, upon insertion, first of all passes into the region of the holding element 14 and only then into the region of the fluid seal 16. As a result, the plug-in part 6 can already be locked against release via the holding element 14 before the connection is sealed via the fluid seal 16. For this reason, a leakage path is formed in such a manner that, in its pre-locking position of the plug-in part 6, which position is locked by the holding element 14 but is not yet sealed via the fluid seal 16, a physically perceptible leakage which is delimited in a defined manner is ensured. This is indicated in FIG. 2 by arrows 36.

According to FIGS. 1 to 4, the leakage path is formed by depressions 40 which are arranged on the outer circumference 38 of the plug-in part 6 and interrupt the cylindrical outer circumference 38, best shown in particular in FIG. 4 in this respect. In the pre-locking position (FIG. 2), these depressions 40 are arranged firstly in the region of the fluid seal 16 and secondly in the region of the dirt seal 10. In the event of a pressurization (pressure p), the respective medium can therefore escape in the arrow direction 36 via the leakage path formed by the depressions 40 and therefore past the seals 16 and 10, which is made noticeable by means of a noise (hissing, whistling).

As is furthermore revealed from FIG. 4, the depressions 40 are preferably arranged in two groups each with a plurality of depressions 40 distributed radially symmetrically over the circumference and spaced apart axially via a cylindrical fluid-sealing section 42. Each group of depressions 40 comprises in particular approximately ten to fifteen, preferably, for example, twelve, depressions 40. On the side opposite the fluid-sealing section 42, a likewise cylindrical dirt-sealing section 46 adjoins the depressions 40 which are situated away from a front plug-in end 44 of the plug-in part 6 and are assigned to the dirt seal 10. The depressions 40 assigned to the fluid seal 16 preferably start from the front plug-in end 44 of the plug-in part 6. All of the depressions 40 preferably in each case have an elongate, in particular approximately rectangular shape oriented in the plug-in direction 12. According to FIGS. 3 and 4, the axial center distance A between the depressions 40 of the two groups corresponds at least approximately to the axial distance B between fluid seal 16 and dirt seal 10.

In principle, the plug connector 1 can be a direct part of any desired assembly part, for example of a valve block. However, in the embodiments illustrated, the housing part 2 can be connected to any desired further assembly part (not illustrated) via (at least) one connecting section 48.

In the embodiments according to FIGS. 1 to 3 and 7, the housing part 2 is designed as a press-in cartridge, with the connecting section 48, which is designed as the plug-in section, being able to be inserted (pressed) into a joining opening of an assembly part (not illustrated). The joining opening may be a simple, smooth-walled hole, for which purpose the connecting section 48 then has tooth-like holding elements 50 and at least one sealing ring 52. As an alternative to this, it is provided, in the embodiment according to FIG. 6, that the connecting section 48 is designed as a screw thread connecting piece 54. In this case, an additional sealing ring 56 is provided, in particular as an axial seal, and a hexagonal stop 58 is provided in order to introduce torque during the screwing of the screw thread connecting piece 54.

Furthermore, in the embodiments according to FIGS. 5 to 7, the invention makes provision for the base part 24 once again to be in two parts comprising a receiving part 60 for the holding element 14, the fluid seal 16 and for the insert part 28 and a joining part 62 for the joining connection of the housing part 2. For this purpose, the joining part 62 has the abovementioned connecting section 48.

By means of this refinement according to the invention, the receiving part 60, with a consistently identical configuration, can advantageously be connected to different, adaptor-like joining parts 62 according to choice, so that a type of modular system is created. In this case, the connecting region between receiving part 60 and joining part 62 is always of identical design whereas the joining region can be designed with different connecting sections 48; compare FIGS. 6 and 7.

The receiving part 60 and the joining part 62 are preferably connected to each other, in particular non releasably, via a snap-action positive fit connection 64. For this purpose, the positive fit connection 64 is designed with a profile which is closed circumferentially. As a result, the parts 60 and 62 can be plugged together and can be latched together in a simple manner but can subsequently not be separated, in any case cannot be separated without being destroyed. The parts are expediently designed in the connecting region in such a manner that their outer contours merge axially into one another in alignment via a gap 66. In this plugged-together region, an annular gap between the receiving part 60 and the joining part 62 is sealed in a fluid-tight manner via a seal 68.

The receiving part 60 preferably consists of plastic while the joining part 62 consists in particular of metal, for example brass.

The fluid seal 16 is arranged in an inner annular chamber 70 which is formed between the base part 24 or the receiving part 60 and the insert part 28.

The abovementioned supporting sleeve 22 can advantageously be formed as a single piece with the receiving part 60 (FIGS. 6 and 7). In the embodiment according to FIGS. 1 to 3, the supporting sleeve 22 is inserted as a separate part into the base part 24.

In a further refinement of the invention, means for securing the plug-in part 6 against rotation about the plug axis are provided. These means for the rotational securing are referred to in the drawing by VDS (see in particular FIGS. 3, 6 and 7 in this respect). This rotational securing VDS is of importance (directional adjustability) in particular in the case of angle connectors. The means for the rotational securing VDS are formed by positive fit elements 72 in such a manner that the respective individual parts can be fitted (plugged together) axially but are secured with a positive fit against rotation relative to one another. Firstly, the plug-in part 6 or the connector piece 8 are connected to the housing part 2 via positive fit elements 72 of this type, this being according to FIG. 3, a section of the plug-in part 6 that engages over the housing 2 and has a hexagonal or multi-toothed engagement. In the case of the two-part design of the base part 24 according to FIGS. 6 and 7, a means of securing against rotation also has to be provided between the receiving part 60 and the joining part 62 by means of corresponding positive fit elements 72. According to FIG. 6, these may be inner positive fit elements 72 which are arranged in an inner plug-in region of the two parts 60 and 62. According to FIG. 7, they are outer positive fit elements 72 which engage over them. An external means of securing against rotation VDS can be realized more easily in terms of manufacturing. An internal VDS has the advantage of a very compact construction without parts protruding on the outside. In the case of the embodiment of the housing 2 as a press-in cartridge (FIGS. 1 to 3 and 7), a further means of securing against rotation VDS (not illustrated) has to be additionally provided in conjunction with the respective assembly part, in particular in the region of the connecting section 48.

While the above description constitutes the preferred embodiment of the present invention, it will be appreciated that the invention is susceptible to modification, variation and change without departing from the proper scope and fair meaning of the accompanying claims.

The invention claimed is:
1. A plug connector for fluid conduits, comprising
a housing part with a plug socket for the fluid-tight insertion of a tubular plug-in part,
a holding element for locking the inserted plug-in part and a fluid seal for sealing the inserted plug-in part being arranged in the plug socket,
the housing part being in two parts comprising a base part and an insert part which is connected to the base part by a first snap-action positive fit connection directly between the insert part and the base part,
the base part comprising a receiving part for the holding element, the fluid seal, and the insert part,
a joining part for the joining connection of the housing part to a fluid conduit,
a dirt seal located on a mouth side of the plug socket,
and a plug-in part received within the plug socket in a pre-locking position wherein the plug-in part is retained by engagement with the holding element and wherein a leakage path is defined within the plug connector between depressions on an outer surface of the plug-in part and inner surfaces of the insert part, the fluid seal, and the dirt seal;
the depressions being arranged in two groups on the outer circumference of the plug-in part including a first group in the region of the fluid seal and further in a second group in the region of the dirt seal, wherein an axial center distance (A) between the depressions corresponds at least approximately to an axial distance (B) between the fluid seal and the dirt seal;
the plug-in part being received within the plug socket in a sealed position after insertion of the plug-in part beyond the pre-locking position wherein the leakage path is sealed off by the fluid seal bearing on a fluid-sealing section around the outer circumference of the plug-in part located axially between the two groups of depressions;
and whereby means for securing against relative rotation are provided between said receiving part and said joining part in such a manner that the receiving part and the joining part can be fitted axially but are secured against rotation relative to one another.

2. The plug connector as claimed in claim 1, wherein an annular gap between the receiving part and the joining part is sealed off in a fluid-tight manner via a seal.

3. The plug connector as claimed in claim 1 wherein the receiving part, with a consistently identical configuration, can be connected to a plurality of different configurations of the joining part.

4. The plug connector as claimed in claim 1 wherein the receiving part is formed of plastic material and the joining part is formed of metal.

5. The plug connector as claimed in claim 1, wherein the holding element is a slotted, radially elastic clamping ring which interacts with an internal cone in the plug socket to lock the plug-in part, the internal cone being formed in the insert part.

6. The plug connector as claimed in claim 1, wherein the fluid seal is arranged in an annular chamber between one of the base parts or the receiving part and the insert part.

7. The plug connector as claimed in claim 1, wherein the depressions in the two groups, in each case, comprise a plurality of depressions which are distributed radially over the circumference and are spaced apart axially on the cylindrical fluid-sealing section of the tubular plug-in part.

8. The plug connector as claimed in claim 7, wherein that, on the side opposite the fluid-sealing section, a cylindrical dirt-sealing section adjoins the depressions which are situated away from a front plug-in end of the plug-in part.

9. The plug connector as claimed in claim 1, wherein the depressions assigned to the fluid seal are located at the front plug-in end of the plug-in part.

10. The plug connector as claimed in claim 1, wherein the depressions each have an elongate, generally rectangular shape oriented in the plug-in direction.

11. The plug connector as claimed in claim 1 wherein the holding element is engaged with the insert part at a ramped surface that causes the holding element to be moved radially inward to further engage the plug-in part during attempted withdrawal of the plug-in part from the plug connector.

12. The plug connector as claimed in claim 1 wherein the receiving part and the joining part are connected to each other via a second snap-action positive fit connection.

13. The plug connector of claim 1 wherein the first snap-action positive fit connection is a releasable connection.

* * * * *